US012543788B2

(12) United States Patent
White

(10) Patent No.: US 12,543,788 B2
(45) Date of Patent: Feb. 10, 2026

(54) APPARATUS FOR HEATING AN AEROSOLIZABLE MATERIAL

(71) Applicant: NICOVENTURES TRADING LIMITED, London (GB)

(72) Inventor: Julian Darryn White, Cambridge (GB)

(73) Assignee: NICOVENTURES TRADING LIMITED, London (GB)

( * ) Notice: Subject to any disclaimer, the term of this patent is extended or adjusted under 35 U.S.C. 154(b) by 784 days.

(21) Appl. No.: 17/755,744

(22) PCT Filed: Nov. 6, 2020

(86) PCT No.: PCT/GB2020/052822

§ 371 (c)(1),
(2) Date: May 6, 2022

(87) PCT Pub. No.: WO2021/090022

PCT Pub. Date: May 14, 2021

(65) Prior Publication Data

US 2022/0386694 A1 Dec. 8, 2022

(30) Foreign Application Priority Data

Nov. 6, 2019 (GB) ...................................... 1916163

(51) Int. Cl.

| | |
|---|---|
| ***A24F 40/46*** | (2020.01) |
| ***A24F 40/20*** | (2020.01) |
| ***A24F 40/57*** | (2020.01) |
| ***H05B 6/68*** | (2006.01) |
| ***H05B 6/72*** | (2006.01) |

(Continued)

(52) U.S. Cl.
CPC .............. *A24F 40/46* (2020.01); *A24F 40/20* (2020.01); *A24F 40/57* (2020.01); *H05B 6/686* (2013.01); *H05B 6/72* (2013.01); *H05B 6/76* (2013.01); *H05B 6/80* (2013.01)

(58) Field of Classification Search
None
See application file for complete search history.

(56) References Cited

U.S. PATENT DOCUMENTS

2005/0184059 A1 8/2005 Clothier et al.
2013/0341322 A1 12/2013 Tabuse et al.
2017/0251718 A1* 9/2017 Armoush ................ A24F 40/40

(Continued)

FOREIGN PATENT DOCUMENTS

CN 103315404 A 9/2013
CN 203424291 U 2/2014

(Continued)

OTHER PUBLICATIONS

Translation of KR 2020-0079694 (Year: 2020).*

(Continued)

*Primary Examiner* — Cynthia Szewczyk
(74) *Attorney, Agent, or Firm* — Merchant & Gould P.C.

(57) ABSTRACT

An apparatus as described herein provides for heating an aerosolizable material to generate an aerosol for inhalation by a user. The apparatus can include a housing containing a first section for receiving an aerosolizable material and a heating arrangement comprising at least one patch antenna for generating a microwave signal for heating the aerosolizable material to generate an aerosol.

17 Claims, 3 Drawing Sheets

(51) Int. Cl.
*H05B 6/76* (2006.01)
*H05B 6/80* (2006.01)

(56) References Cited

U.S. PATENT DOCUMENTS

| | | | |
|---|---|---|---|
| 2018/0271150 A1 | 9/2018 | Sparklin et al. |
| 2019/0000144 A1 | 1/2019 | Bless et al. |

FOREIGN PATENT DOCUMENTS

| | | | | |
|---|---|---|---|---|
| CN | 108552613 | A | | 9/2018 |
| CN | 108777893 | A | * | 11/2018 |
| CN | 208639616 | U | | 3/2019 |
| CN | 208708751 | U | | 4/2019 |
| CN | 110313636 | A | | 10/2019 |
| JP | H05124686 | A | | 5/1993 |
| JP | 10047777 | A | * | 2/1998 |
| JP | 2018057384 | A | | 4/2018 |
| JP | 2018120779 | A | | 8/2018 |
| JP | 2019079761 | A | | 5/2019 |
| JP | 2019517779 | A | | 6/2019 |
| KR | 20190005835 | A | | 1/2019 |
| KR | 20200079694 | A | * | 7/2020 |
| RU | 2685854 | C2 | | 4/2019 |
| WO | WO-2006005348 | A1 | | 1/2006 |

OTHER PUBLICATIONS

Translation of CN 108777893 (Year: 2018).*
Translation of CN 208708751 (Year: 2019).*
Translation of JP 10047777 A (Year: 1998).*
International Search Report and Written Opinion for PCT Application No. PCT/GB2020/052822 mailed on Feb. 2, 2021, 13 pages.
"International Preliminary Report on Patentability received for PCT Patent Application No. PCT/GB2020/052822, mailed on May 19, 2022", 8 Pages.
"Office Action received for Russian Patent Application No. 2022112137, mailed on Mar. 12, 2024", 15 pages (7 pages of English Translation and 8 pages of Official Copy Only).
"Reason for Rejection received for Japanese Patent Application No. 2022-525370, mailed on Nov. 15, 2023", 10 pages (5 pages of English Translation and 5 pages of Official Copy).
"Search Report under Section 17 for Great Britain Patent Application No. 1916163.7, mailed on Dec. 3, 2021", 2 pages.

* cited by examiner

APPARATUS FOR HEATING AN AEROSOLIZABLE MATERIAL

PRIORITY CLAIM

The present application is a National Phase entry of PCT Application No. PCT/GB2020/052822, filed Nov. 6, 2020, which claims priority from GB Patent Application No. 1916163.7, filed Nov. 6, 2019, which is hereby fully incorporated herein by reference.

TECHNICAL FIELD

The present invention relates to an apparatus for heating an aerosolizable material.

BACKGROUND

Apparatus is known that heats aerosolizable material to volatilize at least one component of the aerosolizable material, typically to form an aerosol which can be inhaled, without burning or combusting the aerosolizable material. Such apparatus is sometimes described as a "heat-not-burn" apparatus or a "tobacco heating product" (THP) or "tobacco heating device" or similar. Various different arrangements for volatilizing at least one component of the aerosolizable material are known.

SUMMARY

According to a first aspect of the present invention, there is provided an apparatus for heating an aerosolizable material to generate an aerosol for inhalation by a user, the apparatus comprising: a housing comprising a first section for receiving an aerosolizable material; and a heating arrangement comprising at least one patch antenna for generating a microwave signal for heating the aerosolizable material when the aerosolizable material is received in the first section to generate an aerosol.

Optionally, the apparatus further comprises a shielding material for shielding a user from microwaves generated by the at least one patch antenna.

Optionally, the shielding material comprises a metallic material.

Optionally, the shielding material comprises a reflective foil liner.

Optionally, the first section is configured to receive aerosolizable material that is planar in form.

Optionally, the apparatus further comprises at least two patch antenna, wherein the at least two patch antenna are configured to be selectively operable to heat different heating zones of the aerosolizable material.

Optionally, the apparatus further comprises at least one radio frequency (RF) power amplifier associated with the at least one patch antenna.

Optionally, the at least one patch antenna is in electrical communication with the at least one RF power amplifier through a via provided in the PCB.

Optionally, the heating arrangement is provided in a second section that is separate from the first section.

Optionally, the first section is sealed from the second section.

Optionally, the first section and the second section are disposed either side of a longitudinal axis of the housing.

Optionally, the apparatus further comprises an energy source in electrical communication with the at least one patch antenna.

According to a second aspect of the present invention, there is provided an aerosolizable material heating device, comprising: at least one patch antenna configured to provide microwave energy to an aerosolizable material.

Optionally, the aerosolizable material heating device further comprises a printed circuit board (PCB) on which the at least one patch antenna is disposed.

According to a third aspect of the present invention, there is provided an aerosolizable material heating system comprising: an aerosolizable material comprising a plurality of heating zones; and a microwave heating device for generating a microwave signal for selectively heating at least one of the plurality of heating zones.

According to a fourth aspect of the present invention, there is provided a method of heating an aerosolizable material comprising a plurality of heating zones, the method comprising: generating a microwave signal to selectively heat at least one of the plurality of heating zones.

Further features and advantages of the invention will become apparent from the following description of preferred embodiments of the invention, given by way of example only, which is made with reference to the accompanying drawings.

DETAILED DESCRIPTION

As used herein, the term "aerosolizable material" includes materials that provide volatilized components upon heating, typically in the form of an aerosol. "Aerosolizable material" includes any tobacco-containing material and may, for example, include one or more of tobacco, tobacco derivatives, expanded tobacco, reconstituted tobacco or tobacco substitutes. The tobacco material may comprise one or more of ground tobacco, tobacco fiber, cut tobacco, extruded tobacco, tobacco stem, reconstituted tobacco and/or tobacco extract. "Aerosolizable material" also may include other, non-tobacco, products, which, depending on the product, may or may not contain nicotine. "Aerosolizable material" may for example be in the form of a solid, a liquid, a gel or a wax or the like. "Aerosolizable material" may for example also be a combination or a blend of materials.

Figure 1:
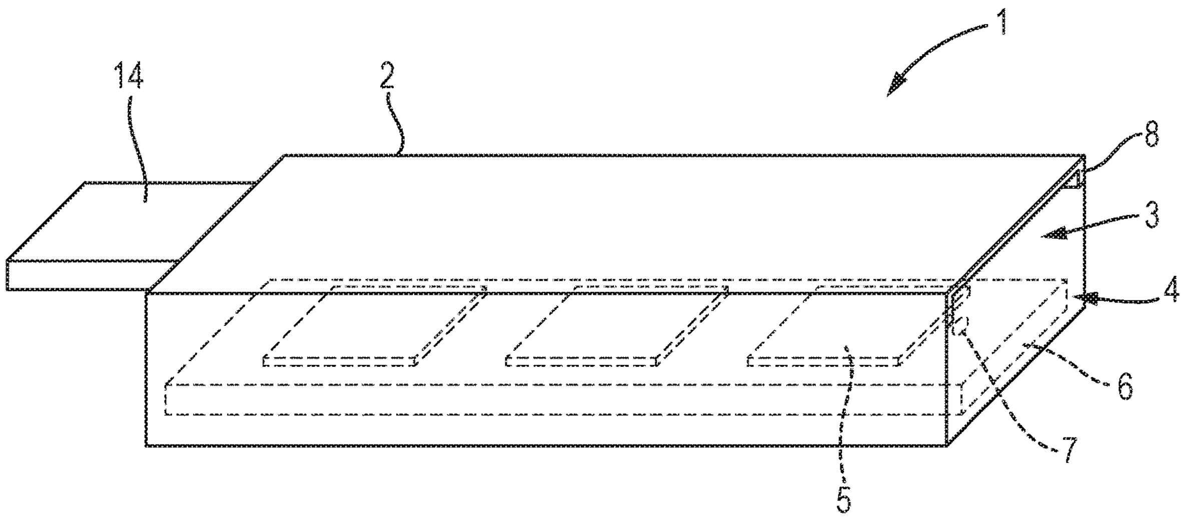
FIG. 1 shows a schematic isometric view of one embodiment of the invention.
Figure 2:
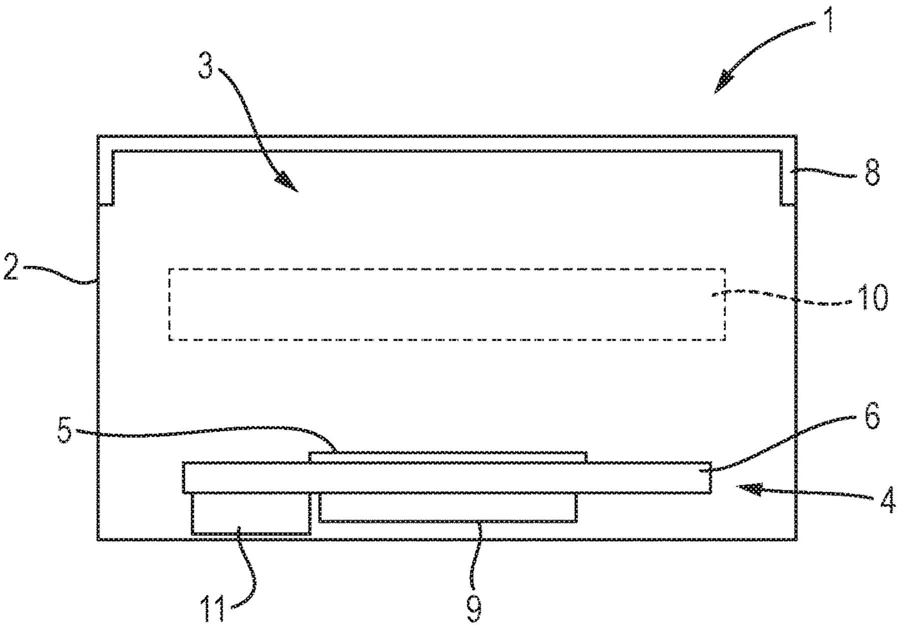
FIG. 2 shows a schematic side of FIG. 1.

FIG. 1 illustrates an apparatus 1 for heating an aerosolizable material 10 (as shown in FIG. 2) to generate an aerosol for inhalation by a user according to one embodiment of the present invention. The apparatus 1 comprises a housing 2 with a first section 3 for receiving an aerosolizable material 10 (as shown in FIG. 2). A heating arrangement 4 comprising a microwave generator for generating a microwave signal for heating the aerosolizable material 10 when the aerosolizable material 10 is received in the first section 3, to generate an aerosol. In this example the heating arrangement 4 comprises at least one patch antenna 5 and the at least one patch antenna 5 is configured to generate a microwave signal for heating the aerosolizable material 10, to generate an aerosol. Although three patch antennae 5 are shown in the example of FIG. 1, any number may be used. For example, 1, 2, 3, 4, 5 or any other integer of patch antennae 5 may be used.

In some embodiments, the microwave signal generated by the at least one patch antenna 5 may have an upper limit of around 5.8 GHz. In some embodiments, the microwave signal generated by the at least one patch antenna 5 has a frequency of between around 2.4 and 2.5 GHz. Advantageously, at least some aerosol ingredients (e.g. glycerol and propylene glycol) interact strongly with radiation in this frequency band. Advantageously, the use of microwaves to heat an aerosolizable material 10 allows the aerosolizable material 10 to be heated directly without the use of a susceptor.

In use, an electrical current may be provided to the at least one patch antenna 5. The at least one patch antenna 5 subsequently generates a microwave signal which is transmitted to the aerosolizable material 10. This causes the aerosolizable material 10 to heat up and generate an aerosol. A user may draw air through a mouthpiece 14 such that the air travels though the housing 2, over the aerosolizable material 10 and out of the mouthpiece 14. As the air travels through the housing 2, it may entrain at least some of the aerosol such that at least some of the aerosol may be inhaled by the user. The provision of electricity to the at least one patch antenna 5 (and therefore the heating of the aerosolizable material 10) may, for example, be as a result of detecting inhalation by a user or upon the depression of a button by the user.

FIG. 2 shows the apparatus 1 of FIG. 1 as viewed from one end of the housing 2. As shown in FIG. 2, the heating arrangement 4 may further comprise at least one radio frequency (RF) power amplifier 9 associated with the at least one patch antenna 5. In one embodiment, an energy source 11 is provided in communication with the at least one patch antenna 5. The RF power amplifier 9 converts a DC current from the power source into an oscillating current. In one embodiment, the number of RF power amplifiers 9 is equal to the number of patch antennae 5. The patch antenna 5 may be electrically connected to an associated RF power amplifier 9 through an electrical via or through hole 7 (shown in FIG. 1) provided in a printed circuit board (PCB) 6.

In some embodiments, the energy source 11 may be a battery. For example, the energy source 11 may be a Lithium-ion (Li-ion) battery. As shown in FIG. 2, the energy source 11 may be provided within the housing 2.

In some embodiments, the heating arrangement 4 may comprise a DC power rail (not illustrated) to provide around 20 to 30 V and about 5 W to the RF power amplifier 9. The heating arrangement 4 may further comprise boost circuitry (not illustrated) to boost the voltage of the energy source 11. In some embodiments, the heating arrangement 4 may comprise a low power rail (not illustrated) of around 3.3 V to power control electronics (e.g. electronics to control the heating arrangement 4). In some embodiments, this voltage may be generated directly from the energy source 11 using a linear regulator.

In some embodiments, the heating arrangement 4 is configured such that a single patch antenna 5 is heated at a time. Advantageously, this minimizes cross-interference between the patch antennae 5 (when more than one patch antennae 5 is used). Moreover, operating a single patch antenna 5 at a time reduces load on the energy source 11.

As shown in FIG. 2, the aerosolizable material 10 may be substantially planar in form. Alternatively, the aerosolizable material 10 may be any other suitable shape. In one embodiment, the shape of the aerosolizable material 10 may be dictated by the shape of the first section 3. In some embodiments the aerosolizable material 10 may be provided as a film of material. In some embodiments, the aerosolizable material 10 may comprise at least one of: a layer of compressed cut rag; a porous substrate, for example cellulose fibers impregnated with the aerosol ingredients; and/or a gel that holds the aerosol ingredients in a weakly bonded matrix.

The heating arrangement 4 may comprise a PCB 6 on which the at least one patch antenna 5 is disposed. In some embodiments, the at least one patch antenna 5 may be formed from the PCB 6.

In some embodiments, the at least one patch antenna 5 comprises a pair of conductive plates separated by an insulating dielectric. For example, the pair of conductive plates may comprise two copper plates although other conductive material may be used instead of copper. In one embodiment, the PCB 6 may act as the insulating dielectric, with the pair of conductive plates disposed on opposite sides of the PCB 6.

In some embodiments, the size of the at least one patch antenna may be determined in accordance with the following equations:

$$\text{Width} = \frac{c}{2f_0\sqrt{\frac{\varepsilon_R+1}{2}}};\ \varepsilon_{eff} = \frac{\varepsilon_R+1}{2} + \frac{\varepsilon_R-1}{2}\left[\frac{1}{\sqrt{1+12\left(\frac{h}{W}\right)}}\right]$$

$$\text{Length} = \frac{c}{2f_0\sqrt{\varepsilon_{eff}}} - 0.824\ h\left(\frac{(\varepsilon_{eff}+0.3)\left(\frac{W}{h}+0.264\right)}{(\varepsilon_{eff}-0.258)\left(\frac{W}{h}+0.8\right)}\right)$$

where εR is the relative permittivity of the substrate, f0 is the radiation frequency, W is the width of the at least one patch antenna 5, c is the speed of light in a vacuum, εeff is the effective permittivity of the substrate and h is the thickness of the substrate.

In some embodiments, the dielectric (e.g. the PCB 6) may have a thickness of between around 1.4 mm and 1.8 mm and the at least one patch antenna 5 may have a width of between around 35 mm and 39 mm and a length of between around 27 mm and 31 mm. Advantageously, these dimensions allow such a patch antenna to be used in a handheld/portable device (i.e. the patch antenna is small enough to be used in a device which is comfortably/conveniently held by the user).

As shown in FIGS. 1 and 2, the housing 2 may be substantially cuboid. Alternatively, the housing 2 may be a cylinder with a substantially circular, semi-circular or oval cross-section. Additionally or alternatively, the housing 2 may provide features to allow it to be easily and comfortably held by the user. For example, the housing 2 may comprise a surface texture to increase friction and therefore increase the grip of a user.

As shown in FIGS. 1 and 2, the apparatus may include a shielding material 8 for shielding the user from microwaves generated by the at least one patch antenna 5. Moreover, the shielding material 8 may aid in directing the generated microwaves onto the aerosolizable material. In some embodiments, the shielding material 8 is a metallic material. In some embodiments, the shielding material 8 comprises a reflective foil liner, for example aluminum. The shielding material 8 may be attached to an inner surface of the housing or may form a part of the housing 2. The shielding material 8 may cover any required proportion of the inner surface of the housing 3. For example, in one embodiment, the shielding material 8 may extend around substantially the entire periphery of the inner surface of the housing 2. In some embodiments, the only requirement may be that the shielding material does not cover the heating arrangement 4 such that microwaves are not prevented from reaching the aerosolizable material 10.

Figure 3:
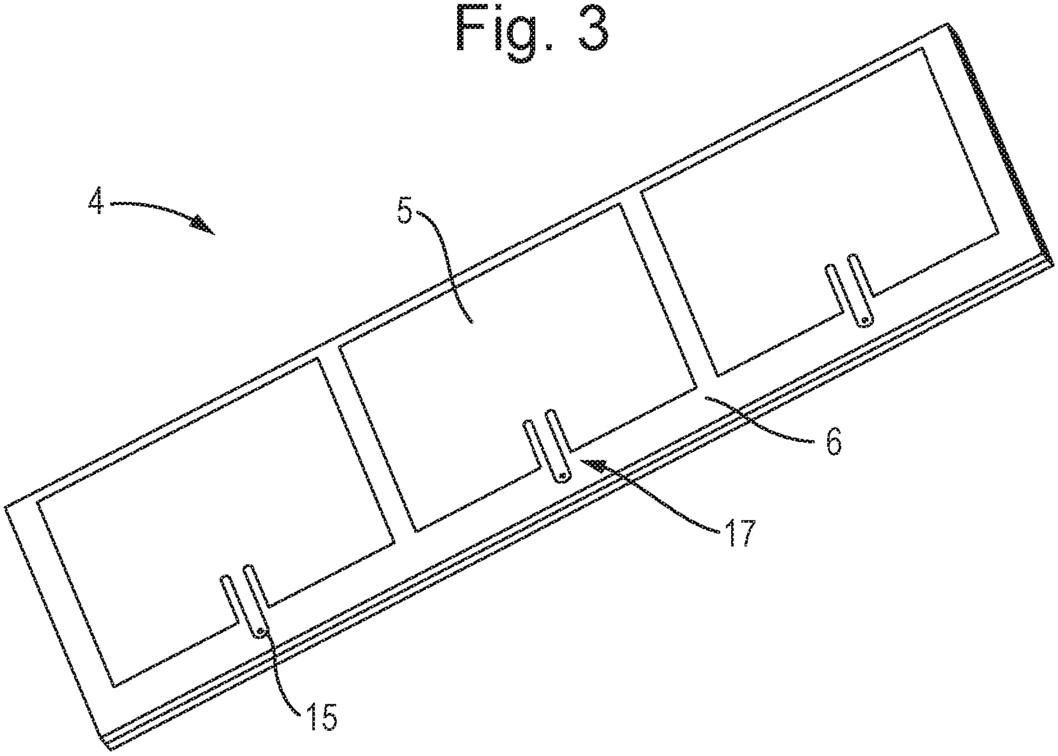
FIG. 3 shows a schematic isometric view of another embodiment of the invention.
Figure 4:
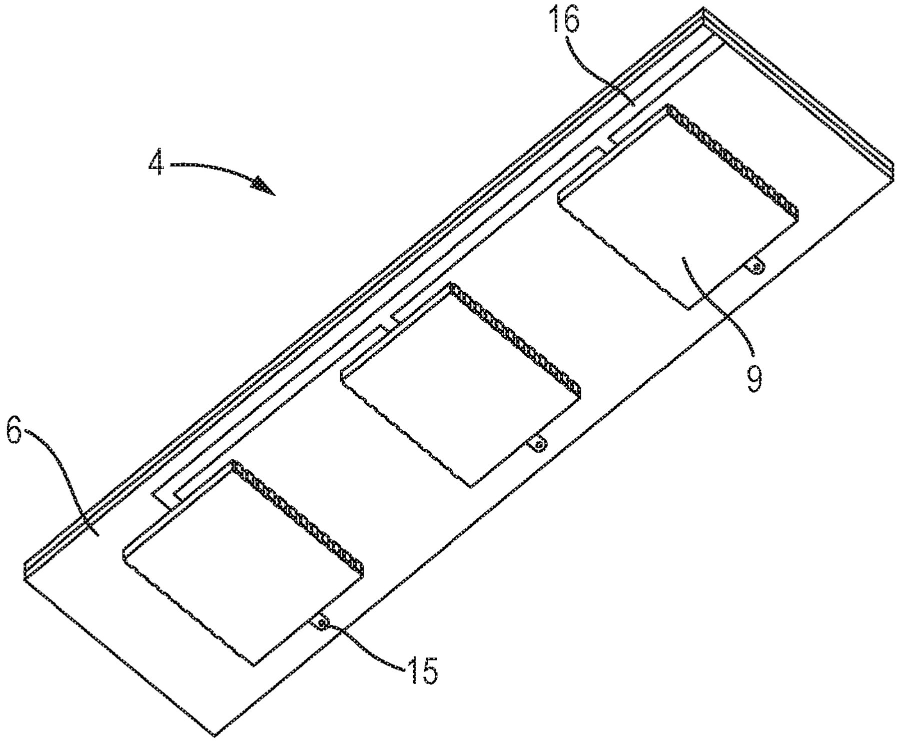
FIG. 4 shows a further schematic isometric view of FIG. 3.

FIG. 3 illustrates an example of the heating arrangement 4 of FIGS. 1 and 2 in isolation. FIG. 4 illustrates the heating arrangement 4 of FIG. 3 from another angle such that the RF power amplifiers 9 are visible. As shown in FIG. 3, the heating arrangement 4 may further comprise an energy feed 15 connecting the RF power amplifier 9 to the at least one patch antenna 5. As shown in FIG. 4, the heating arrangement 4 may further comprise a common clock line/power rail 16. The RF power amplifiers 9 may be controlled by supplying a clock signal whose presence/absence turns the RF power amplifier 9 on/off. The clock signal may be generated by an integrated circuit. The integrated circuit may be provided on the PCB 6 or separate from the PCB 6.

As shown in FIG. 3, the at least one patch antenna 5 may comprise an inset feed 17. Advantageously, the inset feed 17 increases the efficiency of the antenna by reducing the amount of power reflected towards the drive electronics of the at least one patch antenna 5 (e.g. the PCB 6 and RF power amplifier 9).

Figure 5:
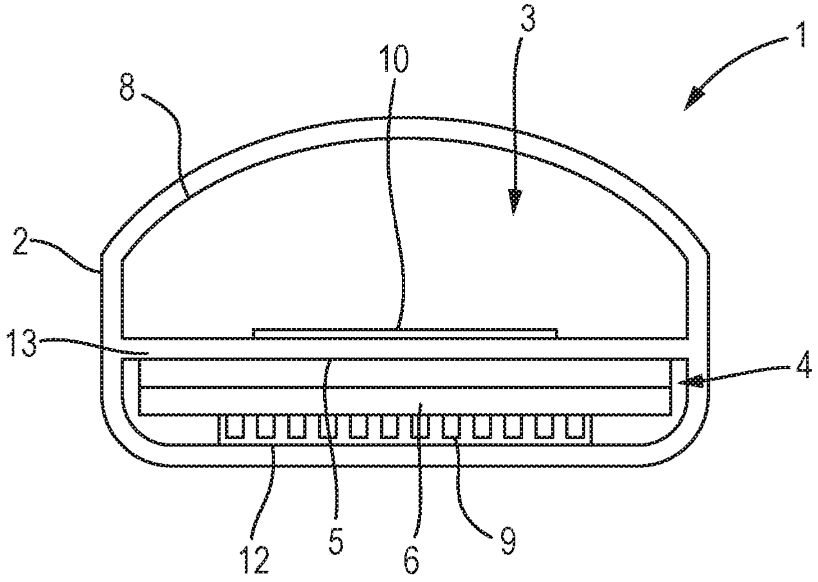
FIG. 5 shows a schematic isometric view of another embodiment of the invention.

In the embodiment shown in FIGS. 1 and 2, the housing 2 has a first section 3. FIG. 5 shows a variation of the embodiment of FIGS. 1 and 2 wherein the housing 2 may further comprise a second section 12. The aerosolizable material 10 may be received in the first section 3, and the heating arrangement 4 may be provided in the second section 12. In some embodiments, the first section 3 is sealed from the second section 12. Advantageously, this allows the heating arrangement 4 to be isolated from the aerosolizable material 10 such that the air path where the aerosol is generated is isolated from the heating arrangement 4. As such, the heating arrangement 4 is protected from being contaminated by the aerosol, thereby extended the lifetime of the heating arrangement 4.

In some embodiments, the first section 3 is separated from the second section 12 by a separator 13. The separator 13 may be made from any material that allows microwave signals to pass through it such that the aerosolizable material 10 can be heated. For example, the separator 13 may be made of woven ceramic fiber or foamed high temperature Kapton.

In some embodiments, the aerosolizable material 10 may be provided in a cartridge. The cartridge may be removable and replaceable. In one embodiment, the cartridge may be biodegradable. For example the cartridge may comprise cardboard or any other similar material. Advantageously, such cartridges may be low cost. Moreover, as the entire cartridge may be removed after use, the cleanliness of the apparatus 1 is maintained.

In some embodiments, as shown in FIG. 5, the shielding material 8 may be shaped such that microwave signals generated by the at least one patch antenna 5 are reflected towards the aerosolizable material 10. In the example of FIG. 5, this is achieved by shaping the first section 3 such that when a shielding material 8 is provided on an inner surface of the first section 3, it will direct the microwave signals towards the aerosolizable material 10. Alternatively, the shielding material 8 may have a different shape to the first section 3.

As shown in FIG. 5, the first section 3 and the second section may be arranged on either side of the longitudinal axis of the housing 2—i.e. the first section and the second section each extend along the length of the housing 2.

In some embodiments, the shape of the housing and/or first section and/or second section may be sized the control the aerosol/air mixture in order to, for example, maximize the proportion of aerosol being swept out of the housing.

In some embodiments, an aerosolizable material heating device comprises at least one patch antenna configured to provide microwave energy to an aerosolizable material. The aerosolizable material heating device may further comprise a printed circuit board (PCB) on which the at least one patch antenna is disposed.

Figure 6:
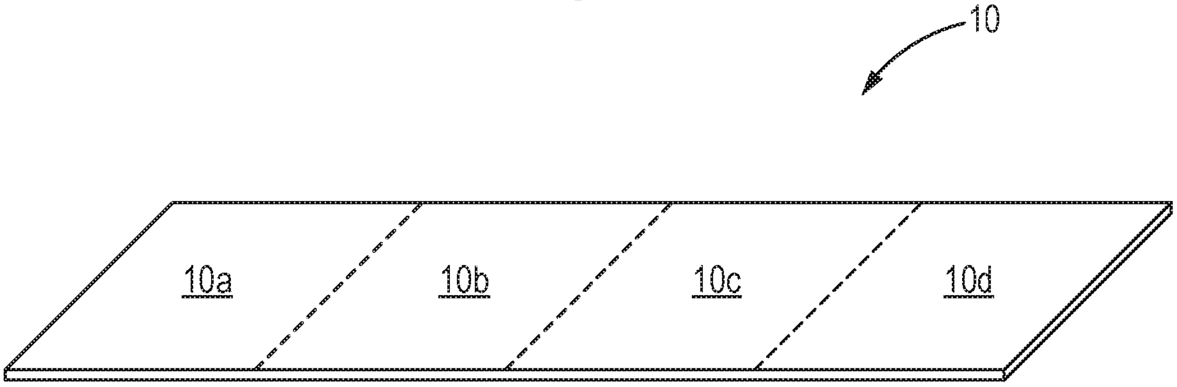
FIG. 6 shows a schematic isometric view of an aerosolizable material according to one embodiment of the invention.

In some embodiments, an aerosolizable material heating system comprises an aerosolizable material 10 comprising a plurality of heating zones 10*a-d* and a microwave heating device for generating a microwave signal for selectively heating at least one of the plurality of heating zones 10*a-d*. Such an aerosolizable material 10 is shown in FIG. 6 where the aerosolizable material 10 comprises a plurality of heating zones 10*a*, 10*b*, 10*c* and 10*d*. The order and timing of heating each heating zone 10*a-d* may be predefined or may be selected by the user. Each heating zone 10*a-d* may be separately heated, or may be heated together with one or more other heating zones 10*a-d*.

Although FIG. 6 shows the plurality of heating zones 10*a-d* being linearly arranged along the aerosolizable material 10, they may be arranged in any other practical way. For example, the plurality of heating zones 10*a-d* may be radially disposed relative to each other. Alternatively or additionally, the plurality of heating zones 10*a-d* may be arranged to vary through the thickness of the aerosolizable material 10 (e.g. such that a cross-section of the aerosolizable material 10 would show discrete zones). Although four heating zones are shown in FIG. 6, any other integer number may be used. For example, there may be 1, 2, 3, 4, 5, 6, 7, 8 or more heating zones.

In some embodiments, the microwave heating device may comprise at least one patch antenna. The number of heating zones may be equal to the number of patch antennae 5 provided. The patch antennae 5 may be selectively operable to heat each heating zone separately.

In some embodiments, a method of heating an aerosolizable material comprising a plurality of heating zones comprises generating a microwave signal to selectively heat at least one of the plurality of heating zones.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

It is to be noted that the term "or" as used herein is to be interpreted to mean "and/or", unless expressly stated otherwise.

The invention claimed is:

1. An apparatus for heating an aerosolizable material to generate an aerosol for inhalation by a user, the apparatus comprising:

a housing comprising a first section for receiving an aerosolizable material; and a heating arrangement comprising at least one patch antenna for generating a microwave signal for heating the aerosolizable material when the aerosolizable material is received in the first section to generate an aerosol.

2. The apparatus according to claim 1, further comprising a shielding material for shielding a user from microwaves generated by the at least one patch antenna.

3. The apparatus according to claim 2, wherein the shielding material comprises a metallic material.

4. The apparatus according to claim 2, wherein the shielding material comprises a reflective foil liner.

5. The apparatus according to claim 1, wherein the first section is configured to receive aerosolizable material that is substantially planar in form.

6. The apparatus according to claim 1, further comprising at least two patch antenna, wherein the at least two patch antenna are configured to be selectively operable to heat different heating zones of the aerosolizable material.

7. The apparatus according to claim 1, further comprising a printed circuit board (PCB) on which the at least one patch antenna is disposed.

8. The apparatus according to claim 7, further comprising at least one radio frequency (RF) power amplifier associated with the at least one patch antenna wherein the at least one patch antenna is in electrical communication with the at least one RF power amplifier through a via provided in the PCB.

9. The apparatus according to claim 1, further comprising at least one radio frequency (RF) power amplifier associated with the at least one patch antenna.

10. The apparatus according to claim 1, wherein the heating arrangement is provided in a second section that is separate from the first section.

11. The apparatus according to claim 10, wherein the first section is sealed from the second section.

12. The apparatus according to claim 10 wherein the first section and the second section are disposed either side of a longitudinal axis of the housing.

13. The apparatus according to claim 1, further comprising an energy source in electrical communication with the at least one patch antenna.

14. The apparatus according to claim 1, wherein the at least one patch antenna comprises a width in the range of 35 mm to 39 mm, a length in the range of 27 mm to 31 mm and a thickness in the range of 1.4 mm to 1.8 mm.

15. An aerosolizable material heating device, comprising:

at least one patch antenna for generating a microwave signal for heating an aerosolizable material configured to provide microwave energy to the aerosolizable material when the aerosolizable material is provided to the aerosolizable material heating device.

16. The aerosolizable material heating device according to claim 15, further comprising a printed circuit board (PCB) on which the at least one patch antenna is disposed.

17. An aerosolizable material heating system comprising:

an aerosolizable material comprising a plurality of heating zones; and a microwave heating device for generating a microwave signal for directly selectively heating at least one of the plurality of heating zones.

* * * * *